United States Patent [19]
Johnsson et al.

[11] Patent Number: 5,705,040
[45] Date of Patent: Jan. 6, 1998

[54] PROCESS FOR PREPARING A SUBSTANTIALLY PURE AQUEOUS SOLUTION OF HYDROGEN PEROXIDE

[76] Inventors: Pekka Johnsson, Puosunrinne 3 A 22, FIN-02320 Espoo, Finland; Tapio Mattila, Kwartellaan 9, 2566 DR Denhaag, Netherlands; Kari Saari, Kaivosvoudintie 4 R 151, FIN-01610 Vantaa, Finland

[21] Appl. No.: 602,089

[22] Filed: Feb. 15, 1996

[30] Foreign Application Priority Data

Feb. 15, 1995 [FI] Finland .................... 950679

[51] Int. Cl.⁶ .................... B01D 3/00; B01D 3/10
[52] U.S. Cl. .................... 203/93; 203/96; 203/98; 159/DIG. 15
[58] Field of Search .................... 159/DIG. 15; 203/92, 203/93, 95, 96, 91, 98; 423/584

[56] References Cited

U.S. PATENT DOCUMENTS

| | | | |
|---|---|---|---|
| 3,617,219 | 11/1971 | Cook, Jr. .................... | 203/83 |
| 5,232,680 | 8/1993 | Honig et al. .................... | 423/584 |
| 5,296,104 | 3/1994 | Signorini et al. .................... | 203/83 |
| 5,456,898 | 10/1995 | Shimokawa et al. .................... | 423/584 |

FOREIGN PATENT DOCUMENTS

| | | |
|---|---|---|
| 0529722 A1 | 8/1992 | European Pat. Off. . |
| 1182410 | 6/1959 | France . |
| 1336389 | 7/1963 | France . |
| 969 396 | 5/1958 | Germany . |
| 55378 | 4/1968 | Poland . |
| 1326282 | 9/1973 | United Kingdom . |

OTHER PUBLICATIONS

"Purification of Hydrogen Peroxide Aqueous Solutions," *Chemical Abstracts* 69:55300 (circa 1968).

*Primary Examiner*—Nina Bhat
*Attorney, Agent, or Firm*—Klarquist Sparkman Campbell Leigh & Whinston, LLP

[57] ABSTRACT

A process for preparing a substantially pure aqueous solution of hydrogen peroxide is described. An impure hydrogen peroxide solution is vaporized in a vaporizer to form a vapor containing hydrogen peroxide and a concentrated hydrogen peroxide solution in equilibrium therewith. The solution also contains impurities. A substantially pure hydrogen peroxide solution is obtained by a partially condensing the vapor containing hydrogen peroxide. In addition to the solution, a residual vapor, in equilibrium with the solution and having a lower hydrogen peroxide concentration, can be condensed in a separate condenser. The concentration of the hydrogen peroxide solution obtained by the process can be regulated, for example, by regulating the condensation efficiency of the partial condensation.

20 Claims, 1 Drawing Sheet

5,705,040

PROCESS FOR PREPARING A SUBSTANTIALLY PURE AQUEOUS SOLUTION OF HYDROGEN PEROXIDE

FIELD OF THE INVENTION

The present invention concerns a method for preparing a substantially pure aqueous solution of hydrogen peroxide.

BACKGROUND OF THE INVENTION

U.S. Pat. No. 3,152,052 concerns a process for purifying hydrogen peroxide wherein an impure hydrogen peroxide composition is subjected to vaporization. The vaporized composition is divided into a pure vapor consisting of hydrogen peroxide and water and a concentrated hydrogen peroxide solution which contains the impurities. The vapor is thereafter directed to a rectifier, in which it is heated further and into which water is additionally fed, for example by reflux cooling of the steam leaving the rectifier. The products obtained from the rectifier are a pure aqueous solution of hydrogen peroxide and a steam which may contain small residues of hydrogen peroxide. The impure concentrated hydrogen peroxide solution is treated in a separate stripper-enricher. The hydrogen peroxide recovered therein is recycled for being combined with the hydrogen peroxide solution being directed to the vaporizer for vaporization.

The disadvantages of the hydrogen peroxide purification treatment described in U.S. Pat. No. 3,152,052 include the complexity and high cost of the process and of the apparatus required to practice the process. Furthermore, as stated in Finnish patent application 923843 (corresponding EP patent 529,722), the process involves a risk of explosion due to the concentrations of hydrogen peroxide and organic impurities.

Finnish patent application 923843 discloses a method for preparing aqueous solutions of purified hydrogen peroxide. The concentration of hydrogen peroxide in such solutions is high, in general over 50% by weight, and usually over 60%. The impure hydrogen peroxide solution to be treated is fed to a vaporizer and thereafter to a phase separator, from which a vapor containing water and hydrogen peroxide and a concentrated hydrogen peroxide solution containing impurities are obtained. The vapor is directed further to a rectifier column which has a scrubbing zone for the removal of any remaining impurities and, above it, a redistillation zone. Pure water is fed into the upper end of the redistillation zone to flow into the column and against the rising stream of vapor. A purified concentrated hydrogen peroxide solution, which is obtained as the final product, and a vapor which is nearly pure water vapor, are removed from the distillation zone of the column.

In the same way as the process described in U.S. Pat. No. 3,152,052, the process described in Finnish Application No. 923,843, and the apparatus it requires, are complicated and expensive. Furthermore, the invention described in Finnish application No. 923,843 is inflexible with respect to varying the concentration of the hydrogen peroxide solution obtained.

SUMMARY OF THE INVENTION

One embodiment of the present invention comprises forming a solution from a vapor which contains hydrogen peroxide that has been separated from an aqueous phase. Impurities are left in the liquid phase by the separation. For example, crude hydrogen peroxide obtained by the anthraquinone process contains as impurities anthraquinone derivatives and metallic impurities derived from the apparatus. These impurities have to be removed from the pure hydrogen peroxide solution obtained as a final product. The process is simpler than known methods, requires less expensive equipment, and enables the concentration of the obtained hydrogen peroxide solution to be varied flexibly.

The process according to the invention comprises forming a substantially pure aqueous solution of hydrogen peroxide by partially condensing a vapor containing hydrogen peroxide. The vapor is cooled by an external transfer of heat so that it will divide into a condensate having a higher concentration of hydrogen peroxide and a residual vapor, in equilibrium therewith, having a lower concentration of hydrogen peroxide. The limits to which the concentration of the hydrogen peroxide solution obtained in accordance with the invention can be varied are determined by the concentration of hydrogen peroxide in the vapor being condensed. Within this variation range, regulating the concentration of the solution obtained can be carried out simply by adjusting the condensation efficiency of the condenser.

The theoretical upper limit of the hydrogen peroxide concentration is the hydrogen peroxide concentration in a solution in equilibrium with the vapor fed into the condenser. For example, this upper limit is from about 70% by weight to about 80% by weight at a hydrogen peroxide concentration of about 30% in the vapor. If the condensation efficiency is low, values close to this theoretical maximum can be arrived at, but the yield of the hydrogen peroxide solution obtained will be low. If the condensation efficiency is increased, the concentration of hydrogen peroxide in the obtained solution becomes lower, while the amount of solution increases. Respectively, the amount of residual vapor decreases and its hydrogen peroxide concentration drops. The method according to the invention is thus excellent for the preparation of, for example, a commercial solution comprising about 35 weight % purified hydrogen peroxide solution.

The theoretical lower limit of the hydrogen peroxide concentration in the solution obtained by the condensation is the concentration of hydrogen peroxide in the vapor fed into the condenser. However, in this case all of the vapor is condensed, and the process no longer involves a partial condensation. According to the present invention, condensation is not carried out to completion; instead, the residual vapor is treated separately, for example in a separate condenser. The dilute hydrogen peroxide solution obtained therefrom can be recycled into the process of the present invention to prepare hydrogen peroxide.

According to the process of the present invention, the pressure prevailing in the partial condensation of a vapor containing hydrogen peroxide can be maintained within a range of from about 30 mbar to about 100 mbar. Currently, a preferred pressure range appears to be from about 50 mbar to about 80 mbar. At pressures this low, there is no risk of explosion.

Water can be used as the cooling heat-transfer medium in the partial condensation of vapor containing hydrogen peroxide. The condensation efficiency may be regulated by regulating the flow rate and temperature of the cooling water.

The purification process according to the invention can start with an impure hydrogen peroxide solution obtained from a process for the preparation of hydrogen peroxide, such as the anthraquinone process. In this case, the first step of the purification process is vaporizing the impure solution. The forming vapor containing hydrogen peroxide settles in an equilibrium with a liquid phase which contains hydrogen peroxide and the impurities. For example, a solution having a hydrogen peroxide concentration of about 50% by weight is divided in the vaporizer at a pressure of about 50 mbar into a vapor phase having a hydrogen peroxide concentration of about 30% by weight and a liquid phase having a hydrogen peroxide concentration of about 73%. The vapor obtained by the process is directed to a drop separator. Any residues of the liquid phase from the drop separator are returned to the vaporizer and the vapor continues its travel to a condenser, where partial vapor condensation according to the invention takes place. At the prevailing pressure of about 50 mbar, the vapor can be divided in the condenser into a pure hydrogen peroxide solution having a hydrogen peroxide concentration of about 35% by weight and residual vapor having a hydrogen peroxide concentration of about 5% by weight. The residual vapor is transferred to an after-condenser, where it condenses in its entirety to a dilute (about 5 weight %) hydrogen peroxide solution. The dilute solution can be returned to the process for the preparation of hydrogen peroxide.

The vapor containing hydrogen peroxide to be partially condensed can be taken directly from the hydrogen peroxide preparation process instead of from the vaporization treatment of impure hydrogen peroxide solutions as discussed above. The condition in this case is that the vapor is pure, i.e. separated from the liquid in connection with the preparation so that any impurities contained in it have been left in the liquid phase. As a result, the preparation of a purified hydrogen peroxide solution according to the invention can easily and flexibly be combined with existing processes for the preparation of hydrogen peroxide.

An object of the present invention is to provide a process for preparing a purified aqueous solution of hydrogen peroxide.

DETAILED DESCRIPTION OF THE PREFERRED EMBODIMENTS

Figure 1:
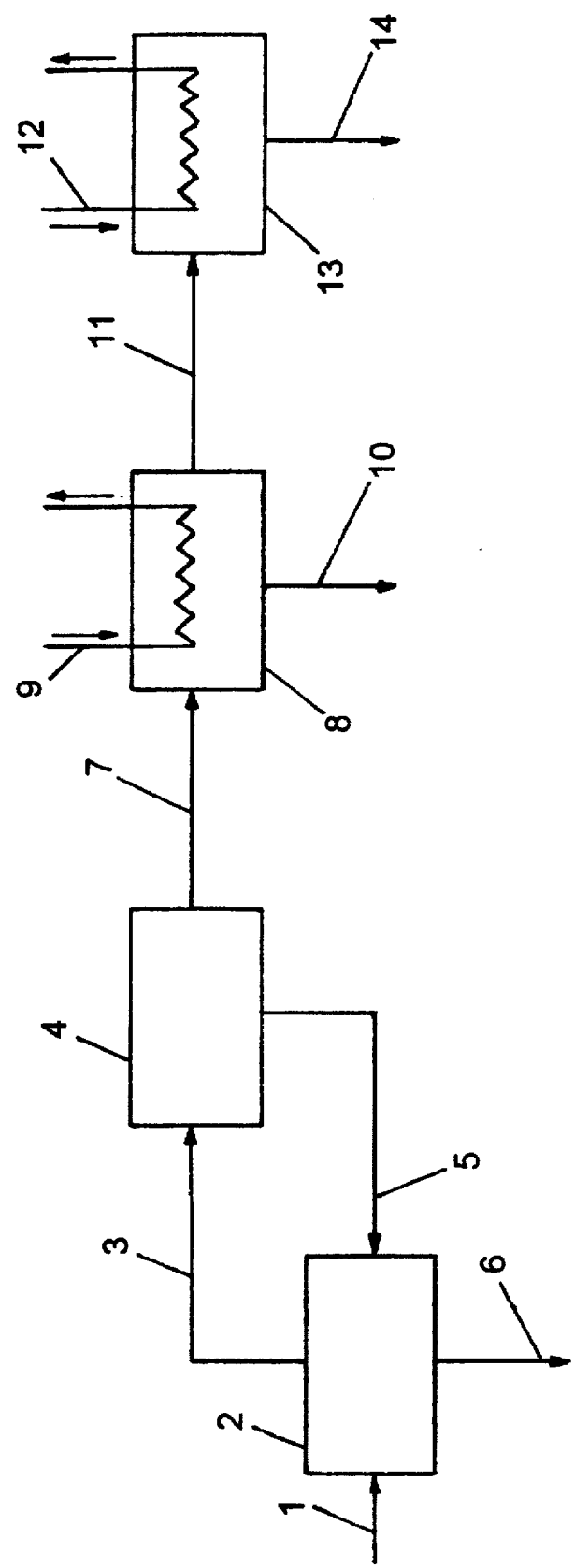
FIG. 1 is a schematic depiction of one process for preparing a hydrogen peroxide solution according to the present invention.

The invention is described below in greater detail with reference to FIG. 1. A working example of one embodiment of the process also is provided. FIG. 1 shows that an impure aqueous solution 1 obtained from a hydrogen peroxide preparation process, such as the anthraquinone process, is directed to a vaporizer 2. Vaporizer 2 may be any vaporizer currently known or hereafter developed which can function in the manner required by the present invention. One example, without limitation, of a suitable vaporizer is a forced-circulation vaporizer operating at an absolute pressure of from about 50 mbar to about 100 mbar. Within this pressure range the temperature of the solution remains at a level sufficiently low in terms of safety. The vaporizer 2 divides the solution fed to it into a vapor having a lower hydrogen peroxide concentration and a solution, in equilibrium therewith, having a higher hydrogen peroxide concentration. Any nonvolatile impurities, such as anthraquinone derivatives and heavy metallic components, remain in the liquid phase.

The vapor 3 produced by vaporizer 2 is directed from vaporizer 2 to a drop separator 4. Drop separator 4 separates liquid 5 and returns liquid 5 to the vaporizer 2. The concentrated hydrogen peroxide solution 6, which contains the impurities, is removed from the vaporizer 2. Vapor 7, which comprises hydrogen peroxide and water, free of liquid drops, is directed from the drop separator 4 to a condenser 8. Condenser 8 is equipped with circulating cooling-water 9. Condenser 8 partially condenses the vapor 7 to a pure aqueous solution of hydrogen peroxide. The forming hydrogen peroxide solution 10, having a higher hydrogen peroxide concentration, is in equilibrium with the remaining residual vapor 11, which has a lower hydrogen peroxide concentration. The amount and hydrogen peroxide concentration of the hydrogen peroxide solution 10 formed by the partial condensation of vapor 7 can be regulated by means of the condensation efficiency.

The hydrogen peroxide solution 10 is removed from the condenser 8 as the final product of the process. The residual vapor 11 is directed further to an after-condenser 13. After-condenser 13 is equipped with circulating cooling-water 12, where the residual vapor 11 condenses in its entirety to form a dilute hydrogen peroxide solution 14.

The following example should be considered as a guide to practicing one embodiment of the present invention only. This example should not be construed to limit the present invention to the specific features described.

EXAMPLE 1

18.7 kg of a raw impure hydrogen peroxide solution, having a hydrogen peroxide concentration of 50 weight % and a temperature of 20° C. was fed into a vaporizer in which the pressure was 80 mbar and the temperature 64° C. As a result of the vaporization at the stated pressure and temperature, 10 kg of a vapor having a hydrogen peroxide concentration of 30 weight % and 8.7 kg of a solution containing the impurities and having a hydrogen peroxide concentration of 73% were removed from the vaporizer. The vapor stream was directed to a drop separator, from which a small amount of liquid separated as drops. These drops were returned to the vaporizer. 10 kg of drop-free vapor was directed, at a pressure of 80 mbar and a temperature of 64° C., further to a condenser. The condenser was cooled with water at a temperature of about 47°C. As a result of the partial condensation, 8.44 kg of a pure hydrogen peroxide solution having a hydrogen peroxide concentration of 35 weight % and 1.56 kg of a residual vapor having a hydrogen peroxide concentration of 5 weight % were removed from the condenser. The residual vapor was directed to an after-condenser, in which 1.56 kg of a hydrogen peroxide solution having a hydrogen peroxide concentration of 5 weight % was obtained at 42° C.

Having illustrated and described the principles of the invention and its preferred embodiments, it should be apparent to those skilled in the art that the invention can be modified in arrangement and detail without departing from such principles. We claim all modifications coming within the spirit and scope of the following claims.

We claim:

1. A process for preparing a substantially pure aqueous solution of hydrogen peroxide, comprising:
    vaporizing an aqueous solution containing hydrogen peroxide to form a vapor containing hydrogen peroxide and a liquid phase containing hydrogen peroxide and impurities;
    separating the vapor from the liquid phase and leaving nonvolatile impurities in the liquid phase; and
    partially condensing the vapor to divide it into a condensate and a residual vapor in equilibrium with the condensate, thereby obtaining the condensate as the product of the process, the condensate being substantially pure and having a higher hydrogen peroxide concentration than the residual vapor.

2. The method according to claim 1 wherein the step of partially condensing the vapor takes place at a pressure of from about 30 mbar to about 100 mbar.

3. The method according to claim 2 wherein the step of partially condensing the vapor comprises condensing by external heat transfer using a vapor-cooling heat-transfer medium.

4. The method according to claim 3 wherein the vapor-cooling heat-transfer medium is water.

5. The method according to claim 2, and further comprising:

forming the vapor containing hydrogen peroxide in a vaporizer, the vapor being in equilibrium with a liquid phase which contains hydrogen peroxide and impurities;

separating water from the vapor in a drop separator; and partially condensing the vapor in a condenser.

6. The method according to claim 1 wherein the step of partially condensing the vapor takes place at a pressure of from about 50 mbar to about 80 mbar.

7. The method according to claim 1 wherein the step of partially condensing the vapor comprises condensing by external heat transfer using a vapor-cooling heat-transfer medium.

8. The method according to claim 7 wherein the vapor-cooling heat-transfer medium is water.

9. The method according to claim 1, and further comprising:

forming the vapor containing hydrogen peroxide in a vaporizer, the vapor being in equilibrium with a liquid phase which contains hydrogen peroxide and impurities;

separating water from the vapor in a drop separator; and partially condensing the vapor in a condenser.

10. The method according to claim 8 wherein the vapor is formed from an impure hydrogen peroxide fed to the vaporizer from a process for the preparation of hydrogen peroxide.

11. The method according to claim 10 wherein the process for the preparation of hydrogen peroxide is an anthraquinone process.

12. The method according to claim 1, and further comprising:

condensing the residual vapor produced by the step of partially condensing in a second condenser to form a dilute hydrogen peroxide solution; and returning the dilute hydrogen peroxide solution to the vaporizer.

13. The method according to claim 1 wherein the concentration of the hydrogen peroxide solution in the condensate is from about 15 weight % to about 75 weight %.

14. The method according to claim 13 wherein a desired concentration of the hydrogen peroxide solution within a range of from about 15%–75% by weight is prepared by regulating the hydrogen peroxide concentration in the vapor to be condensed.

15. The method according to claim 13 wherein a desired concentration of the hydrogen peroxide solution within a range of from about 15%–75% is prepared by regulating the efficiency of the partially condensing step.

16. The method according to claim 13 wherein the condensate comprises about 35% by weight hydrogen peroxide.

17. A method for preparing a substantially pure aqueous solution of hydrogen peroxide, comprising:

vaporizing an aqueous solution containing hydrogen peroxide to form a vapor containing hydrogen peroxide and a liquid phase containing hydrogen peroxide and impurities;

separating the vapor from the liquid phase and leaving nonvolatile impurities in the liquid phase;

partially condensing the vapor by external heat transfer using a vapor-cooling heat-transfer medium at a pressure of from about 30 mbar to about 100 mbar to form a condensate and a residual vapor in equilibrium with the condensate, the condensate being substantially pure and having a higher hydrogen peroxide concentration than the residual vapor;

condensing the residual vapor in a second condenser to form a dilute hydrogen peroxide solution; and returning the dilute hydrogen peroxide solution to the vaporizer.

18. The method according to claim 17 wherein the step of partially condensing the vapor takes place at a pressure of from about 50 mbar to about 80 mbar.

19. The method according to claim 17 wherein the vapor-cooling heat-transfer medium is water.

20. The method according to claim 17 wherein the vapor is formed from an impure hydrogen peroxide fed to the vaporizer from a process for the preparation of hydrogen peroxide.

* * * * *